(12) United States Patent
Flautner et al.

(10) Patent No.: US 12,299,096 B2
(45) Date of Patent: *May 13, 2025

(54) TRUSTED DEVICE (71) Applicant: ARM IP Limited, Cambridge (GB)

(72) Inventors: Krisztian Flautner, Cambridge (GB); Hugo John Martin Vincent, Cambridge (GB); Amyas Edward Wykes Phillips, Cambridge (GB); Robert George Taylor, Cambridge (GB)

(73) Assignee: Arm IP Limited, Cambridge (GB)

( * ) Notice: Subject to any disclaimer, the term of this patent is extended or adjusted under 35 U.S.C. 154(b) by 743 days.

This patent is subject to a terminal disclaimer.

(21) Appl. No.: 17/389,665

(22) Filed: Jul. 30, 2021

(65) Prior Publication Data

US 2021/0357490 A1 Nov. 18, 2021

Related U.S. Application Data

(63) Continuation of application No. 16/525,698, filed on Jul. 30, 2019, now Pat. No. 11,106,774, which is a
(Continued)

(51) Int. Cl.
*G06F 21/32* (2013.01)
*G06F 21/33* (2013.01)
(Continued)

(52) U.S. Cl.
CPC ............. *G06F 21/32* (2013.01); *G06F 21/33* (2013.01); *G06F 21/34* (2013.01); *G06F 21/35* (2013.01);
(Continued)

(58) Field of Classification Search
CPC ............ H04W 12/065; H04W 12/068; H04W 12/069; G06F 21/32; G06F 21/33;
(Continued)

(56) References Cited

U.S. PATENT DOCUMENTS 6,957,771 B2   10/2005   Norris, Jr.
7,941,534 B2    5/2011   de la Huerga
(Continued)

FOREIGN PATENT DOCUMENTS

CN       1520090      8/2004
EP    1 445 679 A2    8/2004
(Continued)

OTHER PUBLICATIONS

Ojala, Sampo; Keinanen, Jari; Skytta, Jorma; "Wearable authentication device for transparent login in nomadic applications environment," 2nd International Conference on Signals, Circuits and Systems, Nabeul, Tunisia, 2008, pp. 1-6.*
(Continued)

*Primary Examiner* — Victor Lesniewski
(74) *Attorney, Agent, or Firm* — NIXON & VANDERHYE P.C.

(57) ABSTRACT

A trusted device, such as a wristwatch, is provided with authentication circuitry, used to perform an authentication operation to switch the trusted device into an authenticated state. Retention monitoring circuitry monitors the physical possession of the trusted device by the user following the authentication operation and switches the trusted device out of an authenticated state if the trusted device does not remain in the physical possession of the user. While the trusted device remains in the physical possession of the user, communication triggering circuitry is used to detect a request to establish communication with a target device that is one of a plurality of different target devices and communication circuitry is used to communicate with that target device using an authenticated identity of the user.

9 Claims, 4 Drawing Sheets

Related U.S. Application Data continuation of application No. 15/994,024, filed on May 31, 2018, now Pat. No. 10,452,831, which is a continuation of application No. 14/951,528, filed on Nov. 25, 2015, now Pat. No. 10,042,996, which is a continuation of application No. 13/920,695, filed on Jun. 18, 2013, now Pat. No. 9,231,765.

(51) Int. Cl.

| | | |
|---|---|---|
| G06F 21/34 | (2013.01) | |
| G06F 21/35 | (2013.01) | |
| H04L 9/32 | (2006.01) | |
| H04L 9/40 | (2022.01) | |
| H04W 12/06 | (2021.01) | |
| H04W 12/065 | (2021.01) | |
| H04W 12/069 | (2021.01) | |

(52) U.S. Cl.
CPC .......... *H04L 9/3226* (2013.01); *H04L 9/3231* (2013.01); *H04L 9/3234* (2013.01); *H04L 63/08* (2013.01); *H04L 63/0853* (2013.01); *H04L 63/0861* (2013.01); *H04W 12/065* (2021.01); *H04W 12/068* (2021.01); *H04W 12/069* (2021.01); *G06F 2221/2133* (2013.01); *H04L 2463/082* (2013.01)

(58) Field of Classification Search
CPC ......... G06F 21/34; G06F 21/35; H04L 63/08; H04L 63/0853; H04L 63/0861; H04L 9/3226; H04L 9/3231; H04L 9/3234
See application file for complete search history.

(56) References Cited

U.S. PATENT DOCUMENTS

| | | | |
|---|---|---|---|
| 8,112,364 B2 | 2/2012 | Phillips | |
| 8,195,569 B2 | 6/2012 | O'Neil et al. | |
| 8,260,262 B2 | 9/2012 | Ben Ayed | |
| 8,369,833 B2 | 2/2013 | McClain | |
| 8,646,056 B2 | 2/2014 | Poplett | |
| 8,976,007 B2 | 3/2015 | Dugan et al. | |
| 9,112,701 B2 | 8/2015 | Sano | |
| 9,195,812 B2 | 11/2015 | Bonhoff | |
| 9,231,765 B2 | 1/2016 | Flautner et al. | |
| 10,042,996 B2 | 8/2018 | Flautner et al. | |
| 10,452,831 B2 | 10/2019 | Flautner et al. | |
| 2002/0030094 A1 | 3/2002 | Curry et al. | |
| 2002/0112183 A1 | 8/2002 | Baird | |
| 2002/0129268 A1 | 9/2002 | Ito et al. | |
| 2003/0046228 A1 | 3/2003 | Berney | |
| 2003/0103414 A1 | 6/2003 | Lyon | |
| 2004/0097217 A1 | 5/2004 | McClain | |
| 2004/0123106 A1 | 6/2004 | D'Angelo et al. | |
| 2004/0153656 A1 | 8/2004 | Cluts et al. | |
| 2005/0032474 A1 | 2/2005 | Gordon | |
| 2005/0033991 A1 | 2/2005 | Crane | |
| 2009/0287853 A1 | 11/2009 | Carson | |
| 2010/0175128 A1 | 7/2010 | Onozu | |
| 2011/0219427 A1 | 9/2011 | Hito | |
| 2011/0289564 A1 | 11/2011 | Archer et al. | |
| 2012/0019379 A1 | 1/2012 | Ben Ayad | |
| 2012/0266220 A1 | 10/2012 | Brudnicki et al. | |
| 2012/0272158 A1 | 10/2012 | Weskamp | |
| 2013/0205373 A1* | 8/2013 | Jaudon | H04W 4/06 726/4 |
| 2013/0269013 A1* | 10/2013 | Parry | H04W 12/068 726/7 |
| 2014/0082706 A1* | 3/2014 | Banford | H04L 63/08 726/5 |
| 2014/0222995 A1* | 8/2014 | Razden | G09B 7/02 709/224 |
| 2014/0223522 A1* | 8/2014 | Steeves | H04L 63/0861 726/5 |
| 2014/0266601 A1* | 9/2014 | Narendra | H04W 12/33 340/5.83 |
| 2014/0274159 A1* | 9/2014 | Bernheim Brush | H04M 1/72454 702/181 |
| 2014/0282868 A1* | 9/2014 | Sheller | G06F 21/316 726/3 |
| 2014/0282893 A1* | 9/2014 | Sheller | H04L 63/08 726/4 |
| 2014/0283016 A1* | 9/2014 | Sambamurthy | H04W 12/069 726/19 |
| 2014/0341441 A1* | 11/2014 | Slaby | G06V 40/193 382/117 |
| 2014/0366111 A1* | 12/2014 | Sheller | G06F 21/316 726/7 |
| 2015/0222639 A1* | 8/2015 | Dulkin | H04L 63/08 726/3 |

FOREIGN PATENT DOCUMENTS

| | | |
|---|---|---|
| EP | 1 701 566 A1 | 9/2006 |
| EP | 2 391 053 A1 | 11/2011 |
| JP | 2001-195145 | 7/2001 |
| JP | 2004-280245 | 10/2004 |
| JP | 2005-528662 | 9/2005 |
| JP | 2005-538430 | 12/2005 |
| WO | 03/021523 A1 | 3/2003 |
| WO | 2003/054814 | 7/2003 |
| WO | 2006/129241 A2 | 12/2006 |
| WO | 2009/028018 | 11/2010 |

OTHER PUBLICATIONS

Acharya, Sayandeep; Fridman, Alex; Brennan, Patrick; Juola, Patrick; Greenstadt, Rachel; Kam, Moshe; "User authentication through biometric sensors and decision fusion," 47th Annual Conference on Information Sciences and Systems (CISS), Baltimore, MD, USA, 2013, pp. 1-6.*

U.S. Appl. No. 16/525,698, filed Jul. 30, 2019; Inventor: Flautner et al.

Office Action dated Feb. 4, 2021 for U.S. Appl. No. 16/525,698, 20 pages.

Porras, J. et al., "Personal Trusted Device in Personal Communications", Sep. 2004, 5 pages.

Alexandre, G. et al., "Security in Proximity Environments", (2011), 82 pages.

Sorber, J. et al., "An Amulet for Trustworthy Wearable mHealth", Hotmobile, vol. 12, (Feb. 28-29, 2012), 6 pages.

"AskTOG", The Apple iWatch, Feb. 2013, 18 pages.

PCT International Search Report and Written Opinion issued Aug. 8, 2014 in PCT/GB2014/051764, (5 pgs).

UK Examination Report dated Dec. 21, 2015 issued in GB 1521024.8, 5 pages.

UK Second Examination Report dated Mar. 8, 2016 issued in GB 1521024.8, 3 pages.

European Examination Report dated Apr. 11, 2016 issued in EP 14733679.6, 5 pages.

UK Examination Report dated Jul. 8, 2016 issued in GB 1521024.8, 4 pages.

European Summons to attend oral proceedings issued Nov. 23, 2016 in EP 14733679.6, 3 pages.

European Result of Consultation issued May 24, 2017 in EP 14733679.6, 7 pages.

Chinese First Office Action issued Jan. 22, 2018 in CN 201480034493.9 and English translation, 17 pages.

Japanese Office Action issued Jan. 9, 2018 in JP 2016-520737 and English translation, 13 pages.

Final Rejection issued Dec. 14, 2018 in JP Application No. 2016-520737 and English translation, 6 pages.

Office Action for JP Application No. 2019-080786 mailed Apr. 21, 2020 and English translation, 7 pages.

English translation of Administrative Conclusion mailed May 12, 2020 in JP Application No. 2016-520737, 20 pages.

(56) References Cited

OTHER PUBLICATIONS

Examination report dated Jun. 11, 2020 for IN Application No. 10750/DELNP/2015 and English translation, 7 pages.
Office Action for KR Application No. 10-2016-7001275 dated Sep. 7, 2020 and English translation, 12 pages.
Office Action for JP Application No. 2019-080786 mailed Jan. 5, 2021 and English translation, 4 pages.

* cited by examiner

User A

Identity 0 — John Smith; PW0, PW1, ...

Identity 1 — Tenant; CarPark PW

Identity 2 — AdultPassenger; TravelCredits

TRUSTED DEVICE

CROSS-REFERENCE

This application is a continuation of U.S. application Ser. No. 16/525,698 filed Jul. 30, 2019, which is a continuation of U.S. application Ser. No. 15/994,024 filed May 31, 2018 (now U.S. Pat. No. 10,452,831), which is a continuation of U.S. Application Ser. No. 14/951,528 filed Nov. 25, 2015 (now U.S. Pat. No. 10,042,996), which is a continuation of U.S. application Ser. No. 13/920,695 filed Jun. 18, 2013 (now U.S. Pat. No. 9,231,765), the entire contents of each of which are incorporated herein by reference in this application.

BACKGROUND

This invention relates to the field of trusted devices. More particularly, this invention relates to a trusted device for use in establishing communication with one of a plurality of different target devices.

A subscriber identity module (SIM) is a good example of a trusted device. It provides a 'secure element' computer processor designed to resist physical tampering and to reject electronic communication by unauthorised parties, placed in the hands of an end user who doesn't control what software runs on the device, in order to facilitate the delivery of services to them.

Whoever controls the device (the authorised party) controls what software runs on it. Because it is physically and cryptographically secure, they can have confidence that the software that runs on the device is the software they put there. They can trust the software to act as their agent, e.g. authorising the card holder to access services, even sometimes while not in communication with the device controller. The device controller does not have to be the entity using the device to provide services: they can act as a gatekeeper, authorising third parties to put agents and information on the device.

An example: Gemalto N.V. manufactures SIM cards, sells them to Vodafone PLC and posts them to Vodafone customers on Vodafone's behalf. Vodafone has software on the cards that let it verify (and, if necessary, prove) that mobile phones connected to its cellular network are operated by particular customers, who it can then bill. Vodafone might also distribute on to the cards a small software program on behalf of Visa, which Visa's mobile app can then use to operate the SIM card like a Visa card, e.g. validating PIN numbers to authorise payment.

In the context of this invention, the trusted device comprises at least a secure element with communication means under the direct control of the secure element. Those means could include near field communication (NFC) other wireless links, and/or user interface elements such as buttons and displays. Thus, a trusted device provides a way of interacting directly with a secure element so that, for example, one could enter a PIN number on-screen and be confident it was going to the software running on the secure element, which is trusted.

A common problem arising in modern digital systems is the need to establish trusted communication with target devices. These target devices could be relatively local, such as a tablet computer connecting to a domestic wifi network, or could be more remote, such as using a smartphone to access a bank account managed by a remote server and accessed over a wireless internet connection. Typical solutions employed today require a user to provide a password to authenticate the trusted device to the target device when communication is established. This may require the user to remember a large number of different passwords. This problem becomes greater as the number of target devices with which a user is likely to wish to communicate increases, e.g. as an increasing number of domestic devices become connected in an internet-of-things. It is possible that a trusted device, such as a smartphone, may store multiple passwords for a variety of connections to be established. However, in this circumstance it is still necessary to preserve security by providing a password protecting the trusted device itself and the need to frequently enter a password on a trusted device can become burdensome. Furthermore, security based purely upon passwords is vulnerable if the password becomes known to another party.

Another known form of security relies upon a user having possession of a token (e.g. a code generator) that they must have in their possession, as well as knowledge of a password, in order to connect to a target device. As an example, the security for a connection to the target device may require the user to obtain a one-time code from the token device and also enter a password thereby providing security based upon something that the user possesses (i.e. the token) and something that the user knows (i.e. the password). While such a system may provide increased security, it also decreases the convenience to the user as more steps are required in order to make the connection.

A long established form of security may be provided based purely upon possession of a physical key. As an example, possession of an appropriately shaped metal key may provide the possessor with the ability to open a locked door. An electronic equivalent to possession of such a physical key, may be, for example, the possession of a door pass that can be used to open an electronically secured door lock. While such systems are relatively quick to use, they can require the user to possess multiple physical keys and are also vulnerable to a loss of these keys allowing an unauthorised possessor of the keys to gain access inappropriately.

The present techniques seek to provide a trusted device that provides a secure way of establishing communication with a target device and yet requires a reduced level of on-going user action to establish those communications. These advantages are particularly useful when the number of target devices with which secured communication is desired increase, such as in an environment containing a large number of devices with which a user may wish to communication as part of their normal daily life (i.e. in an internet-of-things environment where many common device contain embedded processing capabilities with which a user wishes to communicate.

SUMMARY

Viewed from one aspect the present invention provides a trusted device comprising:

authentication circuitry configured to authenticate with an authentication operation an identity of a user having physical possession of said trusted device and thereby switch said trusted device to an authenticated state;

retention monitoring circuitry configured to monitor physical possession of said trusted device by said user following said authentication operation and to switch said trusted device out of said authenticated state if said trusted device is not in physical possession of said user;

communication triggering circuitry configured to detect a request to establish communication received from a target device that is one of a plurality of different target devices; and communication circuitry configured to communicate with said target device if said trusted device is in said authenticated state.

The present techniques provide a trusted device which can be switched into an authenticated state by an authentication operation performed by or upon a user. Retention monitoring circuitry thereafter monitors the continued physical possession of the trusted device by the user when it has been switched into the authenticated state, which may be continuously monitored. If the trusted device is judged as remaining in the physical possession of the user (at least to a predetermined level of probability), then it remains in the authenticated state, whereas if the trusted device is judged as moving out of the physical possession of the user who authenticated that device, then the trusted device moves out of the authenticated state. The trusted device includes communication triggering circuitry which detects requests to establish communication with target devices from among a plurality of different target devices and if the trusted device is still in the authenticated state, then uses communication circuitry to communicate with the target device using an appropriate set of credentials belonging to the user.

One example use scenario for the trusted device is a wearable device which the user authenticates, such as by entering a password or using a biometric characteristic, in order to switch the trusted device into an authenticated state. Thereafter, the wearable trusted device monitors its continued physical possession by the user, such as by a biometric measurement or a proximity sensor, and switches out of the authenticated state if the trusted device is judged to move out of the physical possession of the user. If the trusted device is judged as still in the physical possession of the user when a request to establish communication with a target device is received, then the trusted device will establish that communication, such as by using an appropriate password stored within the trusted device and using an authenticated identity of the user. A user may, for example, authenticate the wearable trusted device once when it is put on at the beginning of the day and thereafter the trusted device may supply any necessary passwords or other credential information to target devices during the remainder of the day providing the wearable trusted device remains within the physical possession of the user.

The communication with the target device can take a wide variety of different forms such as presentation to said target device of credentials including one or more of: an application-program-interface key, a digital certificate, a user identity, a password and cryptographically signed data, including data sent to the trusted device for signature as part of a challenge-response protocol.

The communication can include the creation of credentials for use in subsequent communication as part of the authentication of either or both of the trusted device and the target device.

The communication can include the transfer of information such as configuration data, personalisation preferences, network settings, contracts, receipts, computer programs, data logs, transaction records and credentials.

The credentials/information communicated may be automatically selected using a selection algorithm (optionally user configurable). The automatic selection may be overridden by a manual user selection if necessary, e.g. the trust device suggests a credential to use and the user confirms this or selects another credential, such as from a presented list of alternatives.

An 'identity' consists of a set of information pertaining to and describing a person. In everyday life, our identity consists of our name, job title, telephone number and sundry other information about us and known to others, who associate these details with the person possessing our physical characteristics. Identity in contexts larger than our immediate social circle is provided typically by government-issued documents such as passports, associating our facial features with certain details about us such as name and date of birth and a unique government identifier such as a social security number. Identity online is often comparatively low stakes, serving only to let us access stored state, for instance by loggin in to a discussion forum. In these instances identity may consist of no more than a user name and a password. The password serves a similar purpose to our face in everyday real life, in that it is a credential it is difficult or impossible for anyone else to present.

This identity information may be stored only on the trusted device, or may advantageously be stored or backed up on a separate computer system, probably remote from the trusted device, allowing the user to replace or alternate trusted devices without having to establish all their identity information anew.

The trusted device may support multiple identities for the user of the trusted device, allowing the user, once authenticated, to select which one they wish to use. Such identities may be used as a way of controlling the amount of information concerning a user that is sent to target devices. As an example, one authenticated identity, such as for use in communication with a financial institution, may require a particular individual to be authenticated and accordingly a user-unique authenticated identity (e.g. full name) may be used in such circumstances. However, another form of authenticated identity, such as when communicating with a turnstile on an underground system, may require only that the user is identified as an adult and the appropriate fare for the journey concerned deducted from an electronic wallet within the trusted device. In these circumstances, it may not be desirable for the individual identity of the user to be provided to the transport provider in order to preserve the privacy of the user and accordingly the authenticated identity is merely that of an adult passenger wishing to pay the appropriate fare.

The plurality of different identities may differ in several ways. Identity information associated with the identity concerned and communicated to the target device may vary. Alternatively, or additionally, rights associated with the identity and used during the communication with the target device may vary. As an example, if the target device was used to open a door lock for a meeting room, then one identity may permit the user of the target device to admit themselves to that room whereas another identity supported by the target device may allow the user to unlock that meeting room and admit others for a certain period of time, e.g. unlock the meeting room for an hour if the user had appropriate rights to authorise this action.

Another way of controlling the amount and type of information concerning a user that is sent to target devices is for the trusted device to maintain a single identity for its user, comprising all stored information and credentials for that user, but to present to each target device only such information and credentials as are appropriate and necessary to that device.

The retention monitoring circuitry used to monitor the continued physical possession of the trusted device may take a wide variety of different forms. The physical possession of the trusted device may, for example, be judged by its continued contact with the user concerned or by its continued proximity within a predetermined range of the user. If the trusted device is in physical contact with the user, or within one metre of the user, then it may be judged to remain under the control of the user and accordingly it is safe for it to remain in its authenticated state.

Examples of retention monitoring circuitry include one or more detection circuits comprising at least one of a clasp configured to hold the trusted device attached to the user when the clasp is in a closed state; contact detecting circuitry configured to detect contact between the trusted device and the user using one or more of electrical signals from the user (e.g. ECG, EEG etc) and temperature of the contact area between the trusted device and the user; a proximity detecting circuitry used to measure the distance between the trusted device and the user such that the trusted device may be moved out of the authenticated state if it moves beyond a certain distance from the user; a photo-detector shielded from light when the trusted device is in the possession of the user (e.g. a photo detector on the surface of a wearable device which is covered when the device is being worn by the user); a chemical detector configured to detect chemical characteristics of the user; a biometric detector configured to recognise one or more biometric characteristics of the user; a motion detector configured to detect motion of the trusted device as the user moves (e.g. detection of the characteristic gait of a user); implant detection circuitry configured to detect proximity of an implant (e.g. RF ID tag or magnetic tattoo); and heat flux detection circuitry having a plurality of temperature sensors and configured to detect continued heat flux through the device consistent with the device being in the possession of the user (e.g. a worn trusted device will have a heat flux passing through the device due to the body warmth of the user).

In some embodiments the retention monitoring circuitry may comprise a plurality of detection circuits and be configured to combine those detection results to determine a retention probability corresponding to a measure of how likely it is that the trusted device has remained in the physical possession of the user since it was switched into its authenticated state and to switch a trusted device out of this authenticated state if the retention probability falls below a threshold probability. Combining multiple detection results can improve the accuracy and reliability of the retention monitoring circuitry.

In some embodiments the retention monitoring circuitry may be configured to reduce the retention probability as a time since the last authentication operation increases independently of any of the retention monitoring detection results. This may be used to ensure that an authentication operation is repeated at some minimum interval and to reflect that there will generally be a decrease in the confidence in the continued physical possession of the trusted device as the time since the last authentication operation increases.

The authentication circuitry may also take a variety of different forms. As examples, the authentication circuitry may comprise one or more of biometric recognition circuitry for recognising one or more biometric characteristics of the user; fingerprint recognition circuitry configured to recognise a fingerprint of the user; face recognition circuitry configured to recognise a face of the user; chemical recognition circuitry configured to recognise one or more chemical characteristics of the user; ECG recognition circuitry configured to recognise ECG signals of the user; bioimpedance circuitry configured to recognise one or more bioimpedance characteristics of the user; gait recognition circuitry configured to recognise a gait of the user; and implant recognition circuitry configured to recognise an implant within the user.

It will be appreciated that other authenticated techniques may also be used. A combination of these sensors/detectors and techniques may be used in the authentication operation to increase the security and reliability of the switch into the authenticated state.

It may be that in some embodiments a less precise authentication operation may be accepted upon subsequent authentications in combination with a measure of the retention probability, e.g. if the retention probability indicates that it is likely that the user has remained in physical possession of the target device, even though a further authentication operation is being requested, a higher rate of false positives in that new authentication operation will be tolerated than would otherwise be the case.

The communication triggering circuitry can take a variety of different forms and be activated in a variety of different manners. As examples, the target device may be responsive to at least one of: detection of distance of less than a threshold distance between the target device and the trusted device; detection of the user touching the target device (e.g. electrical conduction of a signal through the body of the user); reception of a message specifying the target device (e.g. from a remote source such as a remote server); and the user selecting the target device from a list of target devices with which communication may be triggered.

The trusted device and the target device may each perform their side of the communication operation independently of whether or not they are at that point in time in communication with any other device. Thus, both the trusted device and the target device may or may not be online with other devices at the time in which they communicate with each other.

The communication circuitry may be configured to provide bi-directional communication between the trusted device and the target device. The trusted device may authenticate itself to the target device, and it is also possible that the target device may authenticate itself to the trusted device.

The trusted device may comprise a display configured to display information from the target device. This information could be used for the operation of the target device or could be used in addition or alternatively to confirm the identity of the target device with which communication is taking place, e.g. the trusted device could be triggered to start communication with and unlock a user's laptop computer and the trusted device would display an indication that such an unlocking operation would be performed unless the user intervened to prevent that locking operation.

The communication circuitry may, in some embodiments, require receipt of a confirmation input from the user before permitting communication with a target device, e.g. the user could be required to confirm they wished to unlock their laptop computer before the unlocking actually took place.

The trusted device could take a variety of different forms. For example, the trusted device could be a wearable device, such as a necklace. However, a particularly useful form of the trusted device is that of a wristwatch.

The trusted device can include identity storage circuitry configured to store identify data for use in communication using the authenticated identity as previously discussed. The identity data may comprise one or more public identity identifiers (e.g. user ids), each having associated secret data (e.g. a password or other security credentials).

The trust relationship established between the user and the trusted device is transitive. That is to say, if target device A trusts trusted device B to correctly authenticate its user, and trusted device B trusts that it is being used by its properly authenticated user C, then the situation is equivalent to A trusting that it is being used by properly authenticated user C.

The trust relationships established by the trusted device can thus extend beyond the target device to one or more levels of further devices. Communication with those further devices use credentials and information stored in the trusted device. The maximum permitted number of levels may be a function of the credential used and/or may be set by a user input to the trusted device.

Viewed from another aspect the present invention provides a trusted device comprising:

authentication means for authenticating with an authentication operation an identity of a user having physical possession of said trusted device and thereby switch said trusted device to an authenticated state;

retention monitoring means for monitoring physical possession of said trusted device by said user following said authentication operation and for switching said trusted device out of said authenticated state if said trusted device is not in physical possession of said user;

communication triggering means for detecting a request to establish communication with a target device that is one of a plurality of different target devices; and communication means for communicating with said target device if said trusted device is in said authenticated state.

Viewed from a further aspect the present invention provides a method of trusted processing comprising the steps of:

authenticating with an authentication operation an identity of a user having physical possession of said trusted device and thereby switch said trusted device to an authenticated state;

monitoring physical possession of said trusted device by said user following said authentication operation and switching said trusted device out of said authenticated state if said trusted device is not in physical possession of said user;

detecting a request to establish communication with a target device that is one of a plurality of different target devices; and communicating with said target device if said trusted device is in said authenticated state.

The above, and other objects, features and advantages of this invention will be apparent from the following detailed description of illustrative embodiments which is to be read in connection with the accompanying drawings.

DESCRIPTION OF EXAMPLE EMBODIMENTS

Figure 1:
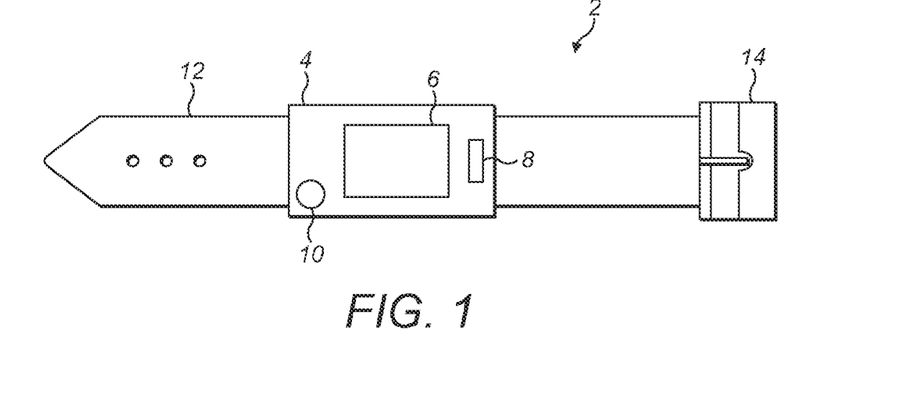
FIG. 1 schematically illustrates a trusted device in the form of a wristwatch.

FIG. 1 schematically illustrates a trusted device 2 in the form of a wristwatch. A wristwatch is a wearable device. Other forms of trusted device could be a necklace, a keyfob for physical keys, etc. The trusted device 2 includes a watch body 4 having a display 6 upon which messages may be displayed. A fingerprint reader 8 is supplied for performing an authentication operation upon a user. A button 10 provides the user with the ability to communicate with the trusted device 2, such as to confirm or reject communication requests, select target devices, input secret data to be held by the trusted device 2, etc. The trusted device 2 includes a strap 12 having a clasp 14. The clasp 14 may be configured such that when the clasp 14 is opened this is recognised by the trusted device 2 and used to switch the trusted device 2 out of the authenticated state. A user wearing the trusted device 2 may authenticate themselves using the fingerprint reader 8 and so switch the trusted device 2 into the authenticated state. Various communication operations with target devices may then be established by the trusted device 2 while it remains within the authenticated state. If the trusted device 2 recognises that the clasp 14 has been opened, then this triggers a switch out of the authenticated state as it is no longer secure to consider that the trusted device 2 has remained in the physical possession (i.e. under the control of) the user who originally authenticated the trusted device 2 using their fingerprint.

Figure 2:
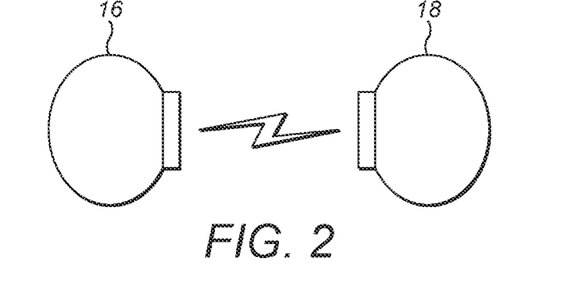
FIG. 2 schematically illustrates two wristwatches as illustrated in FIG. 1 communicating with each other.

FIG. 2 schematically illustrates two wristwatches, such as that illustrated in FIG. 1, between which communication is triggered and then performed. One of these wristwatches 16 may be considered as the trusted device and the other of these wristwatches 18 may be considered as the target device. The trusted device 16 may communicate with many different target devices for many different purposes. Both the trusted device 16 and the target device 18 may be offline (i.e. not in communication with any further device) when the communication between the trusted device 16 and the target device 18 takes place. The communication may be, for example, to pass a virtual key from one user to another user, such as to allow the user of the target device 18 to perform an operation or have access to a device that is secured by the electronic key (e.g. password) that they have just received. An example is that the user of the trusted device 16 may give the user of the target device 18 the right to use their car for a given period of time or in perpetuity by an appropriate secure (trusted) communication made between the trusted device 16 and the target device 18.

Figure 3:
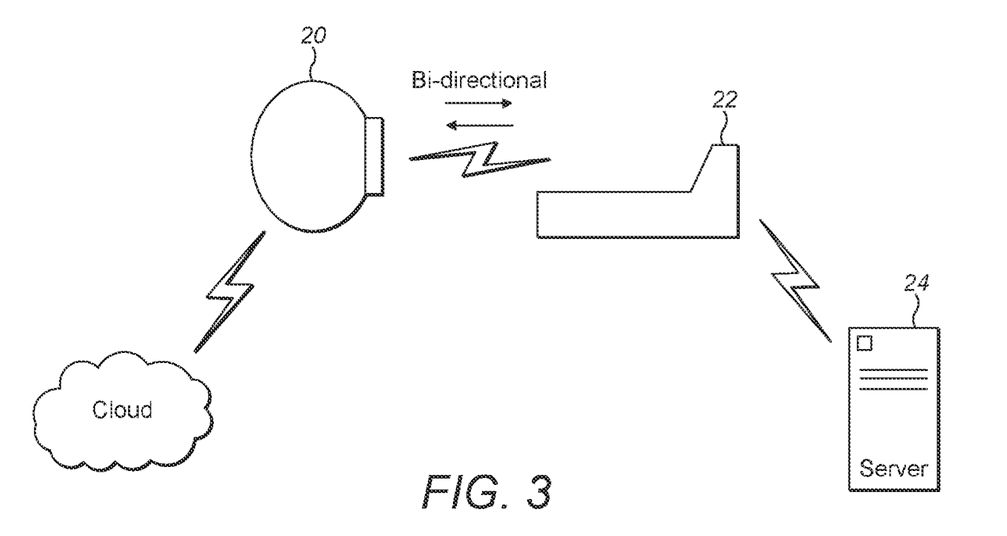
FIG. 3 schematically illustrates a wristwatch communicating with a point of sale terminal.

FIG. 3 illustrates an example in which the trusted device 20 is in the form of a wristwatch and the target device 22 is in the form of a point of sale terminal. The point of sale terminal 22 is in communication over the internet with the remote server 24 of, for example, a merchant or a bank. The trusted device 20 is in communication with one or more further devices over the internet cloud. The communication between the trusted device 20 and the target device 22 is bidirectional. The point of sale terminal 22 may request payment for an item from a user wearing the trusted device 20. The wearer of the trusted device 20 may confirm a displayed identity of the point of sale 22 and a displayed amount to be charged by, for example, pressing the button 10, whereupon this confirmation is sent back to the point of sale terminal 22 which may then communicate via its internet link with a bank server 24 in order to request payment from the bank account of the user of the trusted device 20. In addition, a confirmation of approval of the transaction by the user wearing the trusted device 20 may be transmitted via a separate channel using the internet cloud to reach the bank server 24 and accordingly indicate that the transaction concerned is authorised. Alternatively, the data sent back from the trusted device 20 to the point of sale terminal 22 may include sufficient encrypted data which when forwarded by the point of sale terminal 22 to the bank server 24 indicates that the user of the trusted device 20 has appropriately authorised the transaction concerned.

Figure 4:
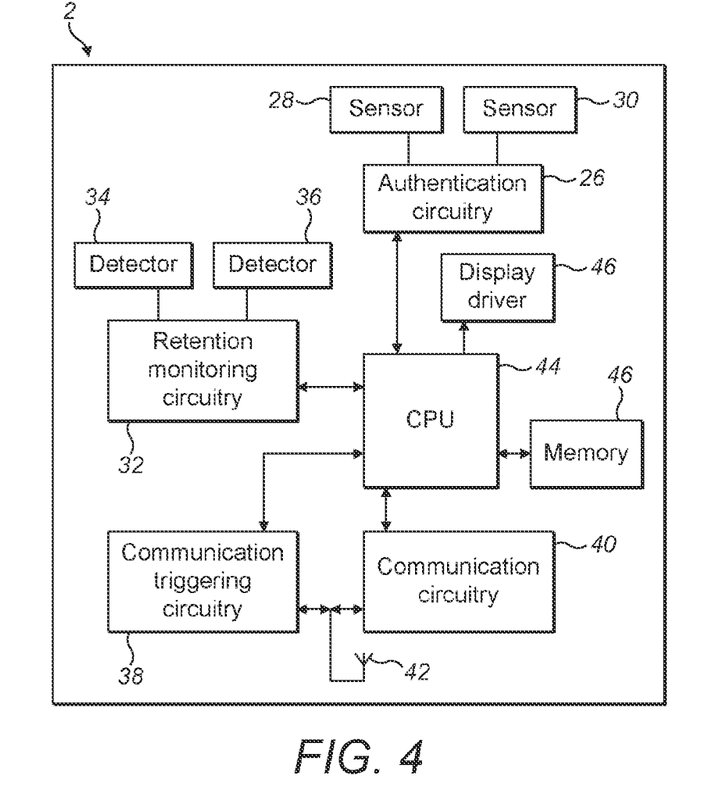
FIG. 4 schematically illustrates circuitry within the trusted device.

FIG. 4 schematically illustrates circuitry forming part of the trusted device 2. The circuitry includes authentication circuitry 26 including a plurality of sensors 28, 30 used to recognise a user as part of an authentication operation. Retention monitoring circuitry 32 is provided with a plurality of detectors 34, 36 which are used to monitor the physical possession of the trusted device 2 by the user following the switching of the trusted device 2 into the authenticated state. The terms sensor and detector as used to assist clarity rather than to suggest any particular difference therebetween. Communication triggering circuitry 38 and communication circuitry 40 are connected to an antenna 42 to receive and transmit signals.

The communication triggering circuitry 38 receives a request from a target device to establish communication with the trusted device 2. The communication circuitry 40 may then authenticate the target device and may permit communication if the target device passes this authentication step. Thereafter, the communication circuitry 40 communicates with the target device using an authenticated identify of the user while the trusted device 2 remains in the authenticated state.

The circuitry illustrated in FIG. 4 includes a central processing unit 44 coupled to a memory 46 which may be used to coordinate and control the acitivies of the authentication circuitry 26, the retention monitoring circuitry 32, the communication triggering circuitry 38 and the communication circuitry 40. The memory 46 may store programs executed by the central processing unit 44, as well as data specifying a plurality of different identities associated with the user. These plurality of different identities may different in the identity information which is associated with each identity and which is communicated with the target device (e.g. a plurality of user ids may be provided). The plurality of identities may also differ in the rights associated with those identities and used during communication with the target device (e.g. what secure rights a particular authenticated identity has granted to it). The memory 46 can serve as identity storage circuitry which stores identity data for use in communicating using the authenticated identity. The identity data may comprise one or more public identity identifiers each having associated secret data (passwords).

The detector circuits 34, 36 associated with the retention monitoring circuitry 32 can take a variety of different forms. Examples of these detection circuits include the clasp 14 illustrated in FIG. 1 which is used to hold the trusted device attached to the user when the clasp is in a closed state and which is monitored by the retention monitoring circuitry 32 such that the trusted device is switched out of the authenticated state if the clasp changes out of the closed state, e.g. the clasp is opened such that it is possible to remove the wristwatch from the wrist of the user.

Another example of detection circuitry is contact detecting circuitry configured to detect contact between the trusted device and the user using one or more of electrical signals (e.g. ECG, EEG etc) from the user and/or temperature of a contact area between the trusted device and the user. The contact detecting circuitry may monitor the heartbeat of the user and if this signal is lost, then this would indicate that the trusted device is no longer in the physical possession of, and accordingly the control of, the user who originally authenticated that device and switched it to the authenticated state. The temperature of a contact area between the trusted device the user can be monitored to ensure that it remains consistent with the trusted device being worn by the user and the trusted device switched out of the authenticated state if the temperature changes to indicate that the trusted device was no longer being worn by the user.

Another form of detection circuitry that may be used is proximity detecting circuitry configured to detect proximity of the trusted device and a proximity device worn by the user. Thus, a user may have a proximity device in the form of, for example, a ring worn on their finger, and the trusted device may monitor the distance between itself and the ring such that if this exceeds a certain threshold, then it indicates that the trusted device (wristwatch) is no longer being worn by the user.

Further forms of detection circuits that may be used by the retention monitoring circuitry include a photo-detector which is shielded from the light when the trusted device is in the physical possession of the user, e.g. a photo-detector on the rear face of the watch such that when the watch is worn on the wrist of the user, this photo-detector receives no light. Removal of the watch from the wrist of the user allows the photo-detector to receive light and this indicates that the watch had been removed and accordingly may no longer be in the physical possession of the user who originally authenticated that trusted device.

A further form of detection circuitry used by the retention monitoring circuitry is a chemical detector configured to detect a chemical characteristic of the user, e.g. a particular characteristic of the skin chemistry of the user. More generally, a biometric detector may be used to recognise one or more biometric characteristics of the user such that if those biometric characteristics are interrupted, then this indicates that the trusted device is no longer in the physical possession of the user. A motion sensor may be configured to detect motion of the trusted device as the user moves while the trusted device is in the physical possession of the user. Thus, for example, the motion sensor may be used to detect a characteristic gait of the user and if this gait signal is not received, then this would indicate that the trusted device is longer in the physical possession of the original user. Implant detection circuitry could be used to detect proximity of an implant within the user and the trusted device. The implant within a user could be an RFID tag placed under the skin of the user close to the position where they wear their wristwatch. Another example of a circuit that might be used by the retention monitoring circuitry is heat flux detection circuitry having a plurality of temperature sensors and used to detect a heat flux through the trusted device. A worn device will typically have a heat flux through it corresponding to the warmth of the user's body passing through the device and the continuation of this heat flux in an uninterrupted form may be monitored as an indication of the continued retention of the trusted device in the physical possession of the user.

Whilst it is possible that the trusted device may comprise a single detector 34, 36 for use in retention monitoring, in some embodiments a plurality of such detection circuits may be provided and the detection results therefrom combined to determine a retention probability that the trusted device is in the physical possession of the user. A retention probability could be determined from a single detector if desired, however combining multiple detection results may increase the reliability with which the continued physical possession of the trusted device by the user may be monitored. There are many ways in which such a plurality of different detection results may be algorithmically combined. The combined result may be give rise to a retention probability and if this retention probability falls below a threshold probability, then this can serve to trigger the trusted device to switch out of the authenticated state. In some embodiments the retention monitoring circuitry 32 may be configured to reduce the retention probability as the time since the last authentication operation (e.g. valid fingerprint recognition operation) increases. Thus, the retention probability would gradually decrease with time since a valid authentication operation such that it would eventually fall below the threshold probability level and switch the trusted device out of the authenticated state even if the retention monitoring circuitry indicates that the trusted device remains within the user's possession. This behaviour can be used to force periodic re-authentication to be performed.

In a similar way in which the detector circuits 34, 36 used by the retention monitoring circuitry 32 may take a variety of different forms, it is also possible that the authentication circuitry 26 may comprise one or more different sensors 28, 30 for performing an authentication operation to authenticate the identity of the user having physical possession of the trusted device and thereby switch the trusted device to an authenticated state. The sensors 28, 30 may include biometric recognition circuitry configured to recognise one or more biometric characteristics of the user. Another example is a fingerprint reader 8 which can recognise the fingerprint of the user. Face recognition circuitry is another possibility, such as through a camera in a face of the watch 2, which uses face recognition algorithms to authenticate the identity of the user wearing the watch. Chemical recognition circuitry may be provided to identify characteristic chemical properties of the skin of the user. Further forms of sensor 28, 30 include ECG recognition circuitry configured to recognise the characteristic ECG signal of a particular user, bioimpedance circuitry configured to recognise one or more bio-impedance characteristics of the user, gait recognition circuitry configured to recognise the characteristic gait (motion) of a user and implant recognition circuitry configured to recognise an implant within the user. It will be appreciated that there may be further different possibilities that are used to authenticate a user and switch the trusted device 2 into the authenticated state. These alternative techniques may be used instead of or in combination with those set out above.

The action of the authentication circuitry 26 may be combined with that of the retention monitoring circuitry 32. As mentioned above, periodic reauthentication of the trusted device 2 may be required. Reauthentication might also be required if a particularly sensitive communication operation was to be performed, e.g. a transaction authorising the spending of a small amount of money might be authorised automatically based upon the trusted device 2 being in the authenticated state, whereas a transaction authorising a larger sum of money might require reauthentication even if the trusted device was in the authenticated state.

It will also be appreciated that in some embodiments authentication circuitry not requiring the user's active attention may simultaneously serve as retention monitoring circuitry.

When reauthentication is requested for whatever reason, if the retention monitoring circuitry 32 indicates that the trusted device 2 has remained in the physical possession of the user since the previous authentication operation, then a higher rate of false positives in the reauthentication may be tolerated and accordingly a less precise identification of the individual may be accepted to reauthenticate the device than would otherwise be the case. In a similar way, reauthentication performed relatively close in time to a previous authentication operation might require a less precise identification of the individual user (i.e. a higher rate of false positives tolerated) than would otherwise be the case. Such features improve usability by permitting easier reauthentication whilst not significantly reducing the security of the system since what is required is effectively a "top up" of the authentication of the trusted device 2 rather than its authentication from a completely untrusted state.

The communication triggering circuitry 38 may be configured to trigger communication of the target device in response to a plurality of different stimuli. Examples which trigger communication with the target device may include detection of a distance of less than a threshold distance between the target device and the trusted device. Thus, in the context of FIG. 3, the trusted device 20 may be moved to within a few centimetres of the point of sale terminal 22 to initiate communication, or the trusted device 20 may be "bumped" against the point of sale terminal 22 to initiate the communication. Another form of stimulus which could trigger the communication would be detection of the user touching the target device. Physical touching of the target device may be detected using electrical connection from the trusted device 2 worn on the user's wrist through the skin/body of the user to the target device. This technique of activating communication with touch is advantageously intuitive and uniquely identifies the target device in an environment which may contain multiple target devices within wireless radio communication of the trusted device 2. Further forms of stimuli which may trigger the communication are receipt of a message specifying a target device (e.g. receipt of a remote message from another person or a remote server) and/or the user manually selecting a target device with which communication is to be triggered from a list of target devices.

Both the trusted device and/or the target device may be permitted to communicate either in one direction or bi-directionally between each other independently of whether or not they are at that point in time in communication with any further devices, i.e. both the trusted device and the target device are permitted to communicate when they are offline with other devices. Alternatively, communication may only be permitted when the target device or the trusted device itself is online with another device.

The Communication may include presentation to the target device of credentials including one or more of: an application-program-interface key, a digital certificate, a user identity, a password and cryptographically signed data. The communication may also involve/trigger the creation of credentials for use in subsequent communications. The communication can involve the transfer of information such as at least one of configuration data, personalisation preferences, network settings, contracts, receipts, computer programs, data logs, transaction records and credentials.

Also illustrated in FIG. 4 is a display driver circuit 46 used for driving the display 6 on the trusted device 2. This display 6 may be used to display information from the target device, such as information specifying the identity of the target device with which communication is currently being made, a message indicating a value of a transaction to be authenticated, etc. The central processing unit 44 may display a message to a user on the display 6 indicating that the user must provide some further information in the form of a conformation input before communication with the target device is permitted. Such a confirmation input may be made, for example, using the button 10 to confirm that a particular point of sale terminal 22 or transport system turnstile is permitted to deduct the cost of an item or the cost of a travel ticket from the bank account accessed via or cash funds loaded on the trusted device.

The communication circuitry 40 may further include target authentication circuitry serving to authenticate the target device using information received from the target device. Thus, both the target device and the trusted device may authenticate the identity of the other party before communication is performed. This can increase the security of the system.

Figure 5:
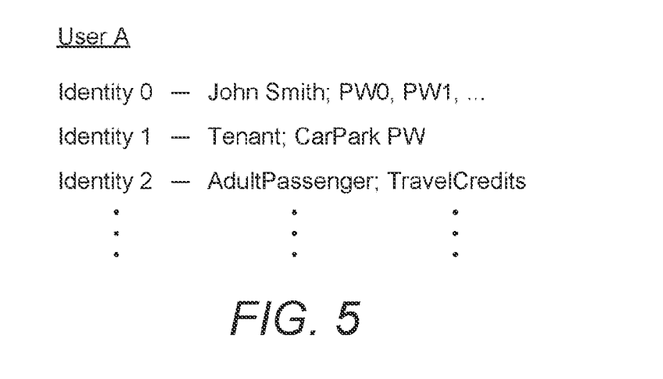
FIG. 5 schematically illustrates data specifying a plurality of authenticated identities.

FIG. 5 schematically illustrates identity information associated with a plurality of different identifies of a user. Identity 0 may specify the individual name (or user id) of the user and one or more passwords to be used with different services or devices with which the user may communicate. As an example, the individual user may have a password to use with their bank, with their front door lock, with their laptop computer etc. A second identity may be Identity 1 which indicates that the user is a tenant of a particular building and the secret information associated with that identity is the password of the car park gate for the building where that tenant lives. Thus, the trusted device may be used to securely provide the car park password without giving the car park system too much private information regarding the user since the individual identity of the user is not revealed in the communication, merely that the user is a tenant of the building and that they possess the appropriate car park password. In a similar manner, a further identity may be Identity 2 which is used on a mass transit system and indicates that the user concerned is an adult passenger and that they have a number of travel credits held in the trusted device and from which a travel fare may be deducted as the user having possession of the trusted device 2 in its authenticated state is passing through the transport system turnstile in order to gain access to the transport system. In a similar way to the previous identity, using this identity merely identifying the user as an adult passenger allows a turnstile operator to confirm that an adult passenger is passing through the turn style without giving unnecessary private information identifying the individual identity of that passenger, which is not needed.

It will be appreciated that this privacy-preserving feature can also be achieved by regulating the set of identity information presented according to each target device.

The credentials/information communicated may be automatically selected using a selection algorithm responsive to detected parameters of the communication (the algorithm may be optionally user configured). The algorithm may produce a suggested credential or information to communicate together with a list of alternatives that the user may manually select if they so wish.

Figure 6:
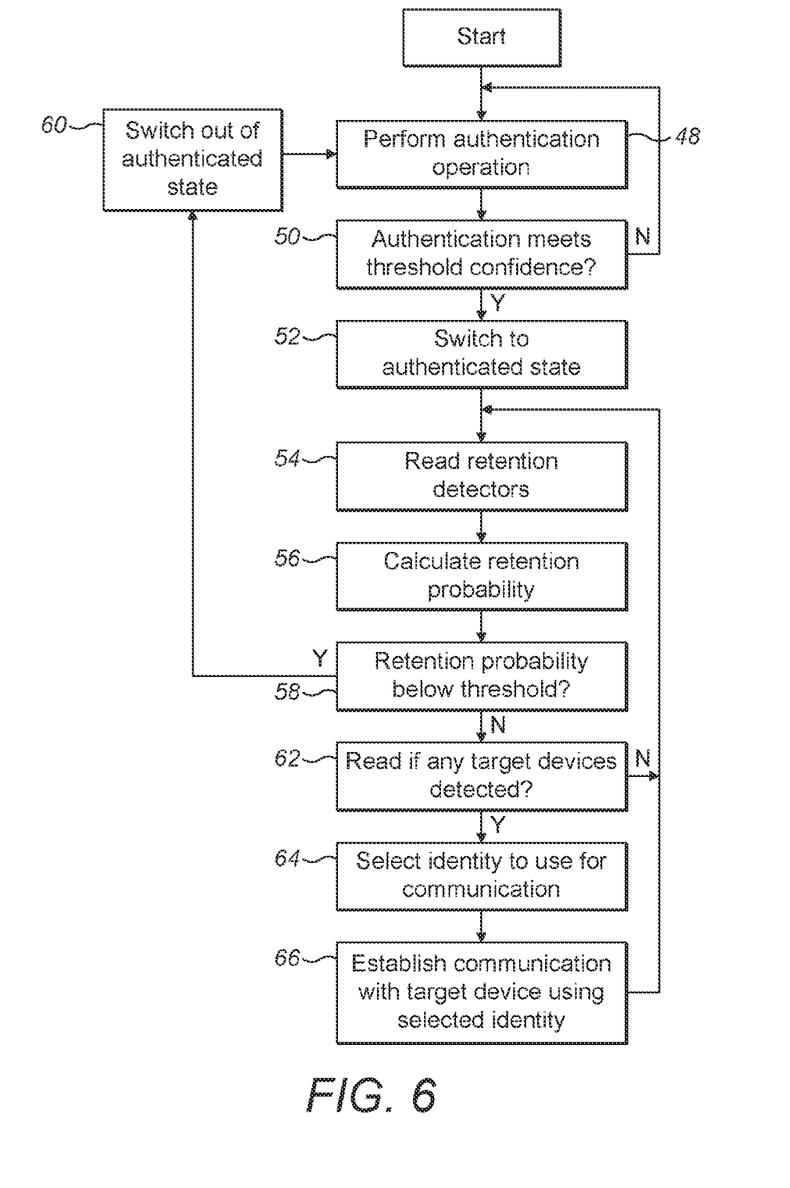
FIG. 6 is a flow diagram schematically illustrating the switching of the trusted device into an authenticated state and the action of retention monitoring circuitry in monitoring the continued physical possession of the trusted device by the user.

FIG. 6 is a flow diagram schematically illustrating the switch of the trusted device 2 into the authenticated state and the monitoring of the continued physical possession of the trusted device by the user. At step 48 an authentication operation is performed. This authentication operation may be, for example, a fingerprint recognition operation. Step 50 determines whether or not the authentication meets a threshold confidence level. If the threshold confidence level is not met, then processing returns to step 48. This threshold confidence level corresponds to a degree of false positives which is tolerated. As previously discussed, this threshold confidence level may vary depending upon the time since the last successful authentication operation or dependent upon the retention probability indicated by the retention monitoring circuitry 32.

If the test at step 50 is that the authentication operation performed at step 48 exceeds the threshold confidence level, then step 52 switches the trusted device 2 into the authenticated state. Step 54 reads the retention detectors 34, 36 and step 56 determines a retention probability (by combining detection signals) indicating the likelihood that the trusted device 2 has remained in the continuous physical possession (control of the user) since the successful authentication operation performed at step 48. Step 58 determines whether or not the retention probability falls below a threshold value. If the retention probability does fall below the threshold value, then processing proceeds to step 60 where the trusted device is switched out of the authenticated state and processing is returned to step 48. If the test at step 58 is that the retention probability is above the threshold value, then processing proceeds to step 62 where a determination is made as to whether or not any target devices with which communication is to be triggered have been detected. If no such target devices are detected, then processing returns to step 54 whereby the retention detectors 34, 36 are read again and an update to the retention probability is performed so as to monitor the continued physical possession of the trusted device while it remains within the authenticated state.

If the determination at step 62 is that a target device has been detected, then step 64 selects an identity from among a plurality of identities that is to be used in communicating with that target device. This selection could be, for example, by a user selecting from a list displayed on the display 6. Alternatively, the identity to be used may be inferred from the identity of the target device, e.g. a car park gate might only require the identity corresponding to that of an appropriately authorised tenant and the car park password to be used. Step 66 uses the communication circuitry 40 to establish communication with the target device using the identity selected at step 64. Processing then returns to step 54 where continued further retention of the target device is monitored.

Figure 7:
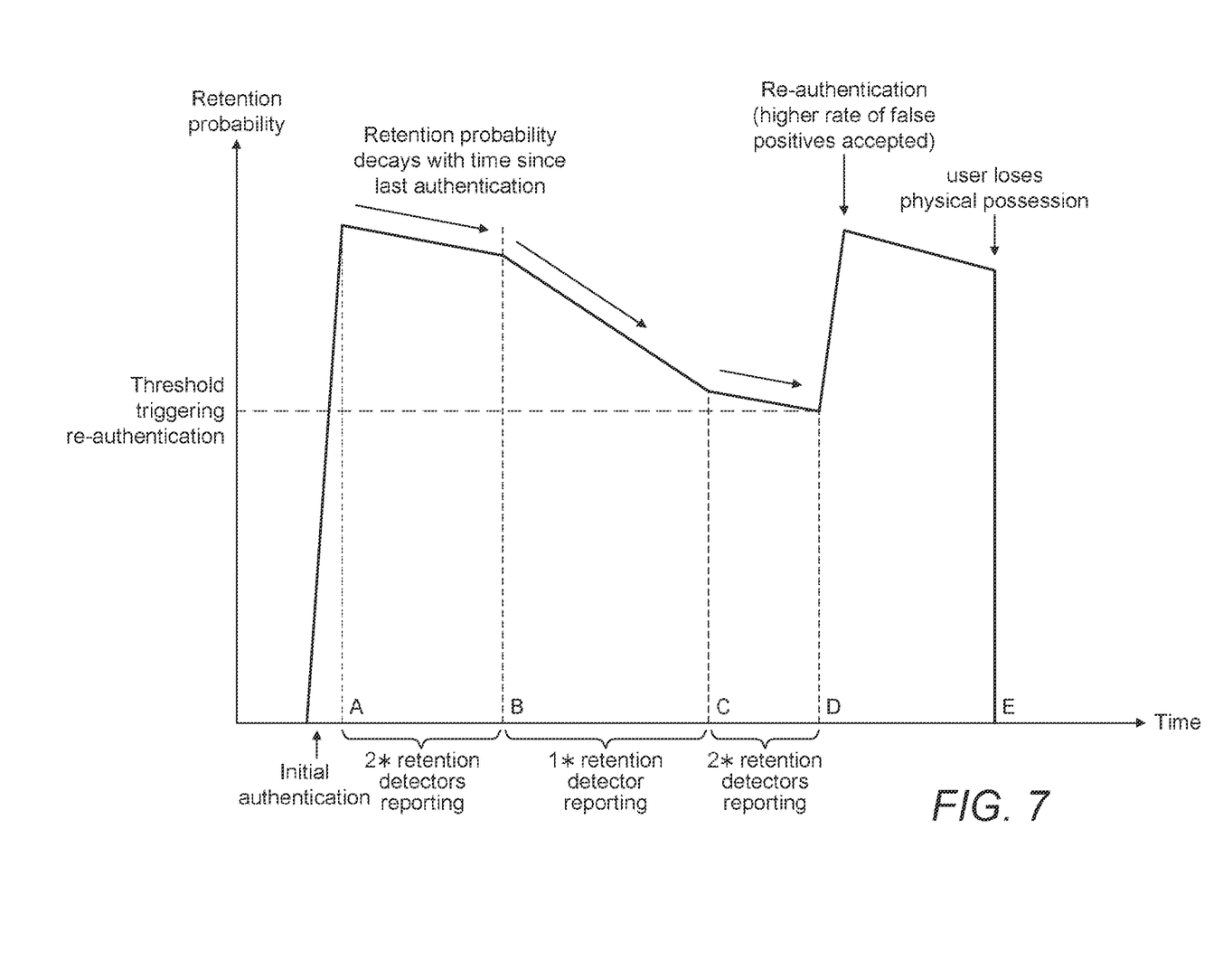
FIG. 7 schematically illustrates a variation in retention probability with time.

FIG. 7 is a graph schematically illustrating how calculated retention probability (step 56) may vary with time. Upon the initial authentication of the trusted device into the authenticated state, the retention probability is increased to a high value above the threshold for triggering re-authentication. This retention probability then gradually declines with time since the last authentication. In the period of time between A and B two retention detectors are reporting that the trusted device 2 as remaining in the physical possession of the user. Accordingly, the rate of retention probability decay is low. Between the times B and C, only a single retention detector is properly reporting the continued physical possession of the trusted device 2 by the user and accordingly the rate of decay of the retention probability increases. Between times C and D two retention detectors are again reporting continued retention of the device and accordingly the rate of decay decreases, but nevertheless falls to the threshold for triggering re-authentication at time D. At time D a reauthentication operation is triggered and performed, but a higher rate of false positives is accepted than for the initial authentication which took place before time A. At time E the user loses physical possession of the device, such as may be indicated by no retention detectors reporting physical possession of the device, or by a master detector, such as the watch clasp 14, indicating that the device has been removed.

As well as the basic transitive trust model implemented by the trusted device, its use enables very flexible and seamless establishment and use of complex trust relationships. For example: a user gains the trust of their watch (fingerprint, wearing it, etc.), they authenticate to a laptop using a trusted wrist watch, subsequently all the websites the user visits automatically use the credentials in the trusted wrist watch to log in, and then some of these web sites may automatically use credentials in the wrist watch to gain further access to resources on other websites. How many levels the transitive relationship goes can be a function of the credentials and/or controllable on the trusted wrist watch.

Another example of such relationships is as follows. A user buys a doorbell button. It gives the user the 'owner key'. The user goes to www.homecontols.com on their tablet, where the site pops up a dialogue saying "you have new devices! Let homecontrols control these?". The user says yes, their trusted wrist watch asks the user to confirm. The user clicks a button on the trusted wrist watch to confirm. Now homecontrols can monitor the user's doorbell button and make a doorbell sound in the user's house via their previously-connected HiFi system.

Another example is as follows. A user opens up www.NHS.gov.uk and goes to the preventative medicine advisory service. It asks to connect to any 'quantified self' resources the user has, the user agrees and the user's trusted wrist watch beeps and displays a message asking for confirmation, the user clicks the 'confirm' button and NHS.gov.uk is temporarily able to get the user's fitbit.com logs, the user's polar.com training logs, the data from the user's gym usage, the 'diet feed' of meal pictures from the user's Google Glass, etc. NHS.gov.uk passes out this data for analytics to various third party services that can use them, collates the results, puts together a report and shows the user a page where the user can move a slider to their desired life expectancy and it tells the user what lifestyle changes they need to make to have a good chance of achieving their goal. When the user leaves, NHS.gov.uk forgets all about the user because it never knew who the user was—only that the user was a UK citizen. The third-party services forget too, because their contract with the NHS says they have to. The websites may update their aggregate dataset though before deleting the individual data.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A wearable device corresponding to a wristwatch, necklace, or a ring comprising:
   authentication circuitry configured to perform an authentication operation between a user and said wearable device to authenticate the wearable device, and thereby switch said wearable device to an authenticated state;
   retention circuitry comprising two or more retention detectors configured to continue to monitor a physical relationship of said wearable device with said user and to determine a retention probability that said wearable device maintains that physical relationship with said user, wherein the physical relationship includes said user wearing said wearable device corresponding to the wristwatch or necklace on a part of the user's body; and
   wherein the authentication circuitry is configured to perform reauthentication by performing an authentication operation between said user and said wearable device when said wearable device retention probability falls below a threshold retention probability level, the threshold retention probability level being adjustable based on (i) a time since authentication and (ii) monitoring of the physical relationship of said wearable device with said user,
   wherein the threshold retention probability level is adjusted at a slower rate when a first number of the two or more retention detectors detects the user has continued to wear the wearable device since a prior authentication operation than when less than the first number of detectors detects the user has continued to wear the wearable device since a prior authentication operation.

2. The wearable device as claimed in claim 1, wherein if the re-authentication operation fails or the wearable device no longer has a physical relationship with said user, the wearable device is configured to switch said wearable device to out of the authenticated state; or
   wherein if the re-authentication operation is successful, the wearable device is configured to increase the retention probability.

3. The wearable device as claimed in claim 1, wherein the wearable device is in an unlocked state for use by the user when the wearable device is in the authenticated state.

4. The wearable device as claimed in claim 1 further comprising:
   communication circuitry to perform authenticated communication with a target device while said wearable device remains in the authenticated state.

5. The wearable device as claimed in claim 4, wherein the target device is in an unlocked state for use by the user when the wearable device is the authenticated state.

6. The wearable device as claimed in claim 4, wherein the target device is configured to accept a payment when the wearable device is in the authenticated state.

7. The wearable device as claimed in claim 4, wherein the target device is at least one of a point-of-sale terminal, tablet computer, laptop computer, smartphone, and door lock.

8. The wearable device as claimed in claim 1,
   wherein the wearable device is configured to reduce said retention probability as time elapses since said authentication operation.

9. An wearable device as claimed in claim 1,
   wherein the initial authentication operation has an initial authentication threshold resulting in an initial rate of false positive authentication.

* * * * *